(12) United States Patent
Xie (10) Patent No.: US 9,329,431 B2
(45) Date of Patent: May 3, 2016

(54) TRANSFLECTIVE LIQUID CRYSTAL DISPLAY PANEL AND TRANSFLECTIVE LIQUID CRYSTAL DISPLAY

(71) Applicant: BOE TECHNOLOGY GROUP CO., LTD., Beijing (CN)

(72) Inventor: Chang Xie, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 219 days.

(21) Appl. No.: 14/125,455

(22) PCT Filed: Dec. 21, 2012

(86) PCT No.: PCT/CN2012/087129
§ 371 (c)(1),
(2) Date: Dec. 11, 2013

(87) PCT Pub. No.: WO2014/005410
PCT Pub. Date: Jan. 9, 2014

(65) Prior Publication Data
US 2015/0323833 A1 Nov. 12, 2015

(30) Foreign Application Priority Data
Jul. 5, 2012 (CN) .......................... 2012 1 0232045

(51) Int. Cl.
*G02F 1/1335* (2006.01)
*G02F 1/1343* (2006.01)
(Continued)

(52) U.S. Cl.
CPC .......... *G02F 1/133555* (2013.01); *G02F 1/137* (2013.01); *G02F 1/13363* (2013.01); *G02F 1/13439* (2013.01); *G02F 1/133514* (2013.01);
(Continued)

(58) Field of Classification Search
CPC .................... G02F 1/133555; G02F 1/133514; G02F 1/133605; G02F 1/13363; G02F 1/13439; G02F 1/137
See application file for complete search history.

(56) References Cited

U.S. PATENT DOCUMENTS

2002/0018279 A1* 2/2002 Molsen .................... G02B 5/00
                                                  359/247
2002/0036728 A1* 3/2002 Okumura ............ G02F 1/13363
                                                  349/61

(Continued)

FOREIGN PATENT DOCUMENTS

CN           101813842 A      8/2010
CN           101976002 A      2/2011
(Continued)

OTHER PUBLICATIONS

International Preliminary Report on Patentability dated Jan. 6, 2015; PCT/CN2012/087129.

(Continued)

*Primary Examiner* — James Dudek
(74) *Attorney, Agent, or Firm* — Ladas & Parry LLP (57) ABSTRACT

A transflective liquid crystal display panel is disclosed and comprises a color-filter substrate, an array substrate, and blue-phase liquid crystal filled between the color-filter substrate and the array substrate, and the transflective liquid crystal display panel further comprises: a common electrode, formed on the color-filter substrate; transparent protrusions, formed in a transmissive region and a reflective region of each pixel unit of the array substrate; reflective portions, formed on the transparent protrusions respectively.

20 Claims, 4 Drawing Sheets

(51) Int. Cl.
*G02F 1/137* (2006.01)
*G02F 1/13363* (2006.01)

(52) U.S. Cl.
CPC *G02F 1/133605* (2013.01); *G02F 2001/13793* (2013.01); *G02F 2001/133638* (2013.01)

(56) References Cited

U.S. PATENT DOCUMENTS

| | | | | |
|---|---|---|---|---|
| 2002/0118323 A1* | 8/2002 | Itou | ............... | G02F 1/133555 349/113 |
| 2004/0066479 A1* | 4/2004 | Liu | ............... | G02F 1/133553 349/123 |
| 2004/0105059 A1* | 6/2004 | Ohyama | ........... | G02F 1/133555 349/114 |
| 2004/0125275 A1* | 7/2004 | Kurasawa | ........... | G02F 1/13362 349/96 |
| 2005/0264732 A1* | 12/2005 | Matsushima | ..... | G02F 1/133555 349/117 |
| 2006/0170846 A1* | 8/2006 | Ozawa | ............... | G02F 1/1393 349/114 |
| 2011/0141410 A1* | 6/2011 | Hsiao | ............... | G02F 1/133555 349/98 |
| 2011/0210332 A1* | 9/2011 | Jintyou | ............. | G02F 1/133524 257/59 |
| 2012/0033156 A1* | 2/2012 | Yamazaki | ......... | G02F 1/133555 349/62 |
| 2012/0105751 A1 | 5/2012 | Mao et al. | | |

FOREIGN PATENT DOCUMENTS

| | | |
|---|---|---|
| CN | 102081268 A | 6/2011 |
| CN | 102778778 A | 8/2012 |

OTHER PUBLICATIONS

Written Opinion of the International Searching Authority dated Mar. 29, 2013; PCT/CN2012/087129.
International Search Report Issued Apr. 18, 2013 Appln. No. PCT/CN2012/087129.
First Chinese Office Action Issued May 27, 2014 Appln. No. 201210232045.2

* cited by examiner

TRANSFLECTIVE LIQUID CRYSTAL DISPLAY PANEL AND TRANSFLECTIVE LIQUID CRYSTAL DISPLAY

TECHNICAL FIELD

The present invention relates to a transflective liquid crystal display panel and a transflective liquid crystal display.

BACKGROUND

In the technical field of liquid crystal display, thin film transistor liquid crystal displays (TFT-LCDs) belong to a main kind of flat-panel display devices.

According to different employed light sources, liquid crystal displays are classified into transmissive liquid crystal displays, reflective liquid crystal displays and transflective liquid crystal displays. Among them, a transflective liquid crystal display has both advantages of a transmissive liquid crystal display and of a reflective liquid crystal display, and can be used both indoors and outdoors. Moreover, a transflective liquid crystal display utilizes a backlight and ambient light simultaneously and has low-power consumption, and is widely used in display devices of portable and mobile electronic products.

Transflective liquid crystal displays, in which the liquid crystal molecules are blue-phase liquid crystal, in virtue of rapid response speed of the components and good quality of displayed images, have attracted lot of attention. Blue-phase liquid crystal can change its isotropic refractive index into an anisotropic refractive index, based on the magnitude of the voltage applied thereto. With blue-phase liquid crystal, an alignment film is not required to be provided in a display panel, which makes the implementation procedure simple; further, blue-phase liquid crystal realizes a faster response speed.

The existing transflective blue-phase liquid crystal display panel is a lateral electric field mode liquid crystal display panel, in which electrodes are provided on a same substrate of the transflective blue-phase liquid crystal display panel to generate for example an In-Plane Switching (IPS) mode electric field, which is also called as a lateral electric field, and such an electric field needs a high driving voltage of about 20~30V for normal image display. Besides, lateral electric field electrodes are provided on an array substrate, and therefore stronger electric field intensity occurs near the array substrate and weaker electric field intensity occurs near the color-filter substrate. This results an uneven distribution of the electric field in the liquid crystal layer, which has an influence on the displayed image of the device.

In addition, the existing lateral electric field mode transflective blue-phase liquid crystal display panel has a step provided between a light transmissive region and a light reflective region, to balance phase retardation respectively produced when light passing through the transmissive region and the reflective region. But the implementation is difficult.

In summary, the existing transflective blue-phase liquid crystal display panel needs a high driving voltage, and has difficulty in balancing phase retardation respectively produced when light passing through the transmissive region and the reflective region.

SUMMARY

Embodiments of the present invention provide a transflective liquid crystal display panel and a transflective liquid crystal display for reducing the driving voltage of the transflective liquid crystal display panel and of the transflective liquid crystal display.

In one aspect, the present invention provides a transflective liquid crystal display panel, comprising a color-filter substrate, an array substrate, and blue-phase liquid crystal filled between the color-filter substrate and the array substrate; the transflective liquid crystal display panel further comprises: a common electrode, formed on the color-filter substrate; transparent protrusions, formed in a transmissive region and a reflective region of each pixel unit of the array substrate; and reflective portions, formed on the transparent protrusions respectively.

For example, the reflective portions are electrically non-conductive light-reflecting film layers.

For example, each of the reflective portions in the transmissive region comprises thereon a first reflective surface and a second reflective surface, and each of the reflective portions in the reflective region comprises thereon a first reflective surface; the first reflective surface is in contact with the blue-phase liquid crystal, and the second reflective surface is in contact with the transparent protrusion.

For example, the transflective liquid crystal display panel further comprises a pixel electrode formed on the array substrate, wherein the transparent protrusions are provided on the pixel electrode.

For example, in the transmissive region, light from a backlight is reflected by the second reflective surface of the reflective portion of one transparent protrusion to change a direction of the light, so that the light travels towards the first reflective surface of the reflective portion of one adjacent transparent protrusion to change the direction of the light again, and then the light emits out through the color-filter substrate.

For example, in the reflective region, light from outside is changed in a direction of the light twice by the first reflective surfaces of the reflective portions of adjacent transparent protrusions, and then emits out through the color-filter substrate.

For example, when no voltage is applied between the color-filter substrate and the array substrate, the blue-phase liquid crystal molecules are isotropic.

For example, when a voltage is applied between the color-filter substrate and the array substrate, a vertical electric field is generated between the color-filter substrate and the array substrate, and the blue-phase liquid crystal molecules under the effect of the vertical electric field are elongated in their long axes with their long axes being parallel to the electric field direction.

For example, the transmissive region and the reflective region in each pixel unit comprise a plurality of transparent protrusions, projections of which on the array substrate are in a strip-like arrangement, and the reflective portion on each transparent protrusion has its projection on the array substrate also in a strip-like arrangement.

For example, bottom surfaces of the transparent protrusions in each pixel unit adjoin each other.

For example, shapes of the transparent protrusions in the transmissive region and the reflective region in each pixel unit are the same or different.

For example, sizes of the transparent protrusions in the transmissive region and the reflective region in each pixel unit are the same or different.

For example, a cross-section of each transparent protrusion is in a shape of a triangle.

For example, the cross-section of the transparent protrusion is in a shape of a right triangle.

For example, the cross-section of the transparent protrusion is in a shape of an isosceles right triangle.

For example, the right triangle corresponding to each transparent protrusion in the transmissive region has one right-angle side thereof disposed on the array substrate, with the reflective portion being formed on the hypotenuse of the right triangle; and the right triangle corresponding to each transparent protrusion in the reflective region has its hypotenuse disposed on the array substrate, with the reflective portion being formed on the two right-angle sides of the right triangle.

For example, a length of the right-angle side of the right triangle corresponding to each transparent protrusion in the transmissive region is equal to a length of the hypotenuse of the right triangle corresponding to each transparent protrusion in the reflective region.

For example, a length of the right-angle side of each transparent protrusion in the transmissive region is 1~3 μm.

In another aspect, the present invention provides a transflective liquid crystal display, which comprises a transflective liquid crystal display panel as described above.

For example, the transflective liquid crystal display further comprises: a first quarter-waveplate, provided on the color-filter substrate on a side not in contact with the blue-phase liquid crystal; a first half-waveplate, provided on the first quarter-waveplate; a first polarizer, provided on the first half-waveplate; and a second quarter-waveplate, provided on the array substrate on a side not in contact with the blue-phase liquid crystal; a second half-waveplate, provided on the second quarter-waveplate; a second polarizer, provided on the second half-waveplate.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

An embodiment of the present invention provides a transflective liquid crystal display panel and a transflective liquid crystal display, for reducing the driving voltage of the transflective liquid crystal display, and for balancing phase retardation respectively produced when light passing through a transmissive region and a reflective region, thereby achieving higher quality of displayed images.

The transflective liquid crystal display provided by an embodiment of the present invention is a transflective liquid crystal display based on blue-phase liquid crystal, i.e., a transflective liquid crystal display with the liquid crystal panel thereof filled with blue-phase liquid crystal.

Below is a brief introduction of blue-phase liquid crystal and the transflective liquid crystal display provided by the present invention.

Blue-phase is a kind of liquid-crystal phase between an isotropic state and a cholesteric phase. Generally, the temperature range in which blue-phase liquid crystal exists is very narrow, which is only a temperature range of about 1° C. However, after it undergoes polymer-stabilization, its existing temperature range become relatively large, which can substantially meet the operating temperature range required for a liquid-crystal display material. Blue-phase liquid crystal materials have fast-response characteristics, from which the formed liquid crystal display panel have a fast response speed. Accordingly, the transflective blue-phase liquid crystal display has the following advantages:

1. Blue-phase liquid crystal materials in the case of no voltage applied thereto are isotropic, and the transflective liquid crystal display has features of a wide viewing angle and a good dark-state.

2. Blue-phase liquid crystal materials have fast-response characteristics, and the transflective liquid crystal display can have response time of milliseconds or less in theory, which greatly improves the response speed of the transflective liquid crystal display.

3. Because of polymer stability of blue-phase liquid crystal and its isotropy in the case of no voltage applied thereto, an alignment film layer is not required to be provided on the color-filter substrate or on the array substrate, thereby reducing the manufacturing costs of the transflective liquid crystal display and simplifying the manufacturing process.

In the case where the transflective liquid crystal display panel is not applied with a voltage, the blue-phase liquid crystal molecules are not affected by an electric field, and the blue-phase liquid crystal molecules are in an isotropic state, thus when light passes through the isotropic-state blue-phase liquid crystal in both the transmissive region and the reflective region, no phase retardation will be produced. Since the emitting light has no change in its polarization direction, it will be transmitted through the polarizer of the color-filter substrate, the absorption axis of which is parallel, achieving display of a bright-state.

In the case where the transflective liquid crystal display panel is applied with a voltage, the blue-phase liquid crystal molecules are affected by a vertical electric field between the array substrate and the color-filter substrate, and the liquid crystal molecules are oriented with their long axes being along the direction of the electric field lines; and, when light propagates along the long axes of the blue-phase liquid crystal molecules, no phase retardation will be produced, whereas when light propagates along the short axes of the blue-phase liquid crystal molecules, phase retardation will be produced.

The embodiment of the present invention has different reflective portions provided in the transmissive region and the reflective region of each pixel unit, for reflecting light, so that light is changed in its propagation direction by the reflective portions, that is, light is changed, by the reflective portions, from a direction perpendicular to the panel to a direction non-perpendicular to the panel, and then the light is changed in its propagation direction again by an adjacent reflective portion, and finally the light is emitted out the panel.

Below, with reference to the accompanying drawings, technical solutions provided by the embodiment of the present invention will be explained in detail.

Figure 1:
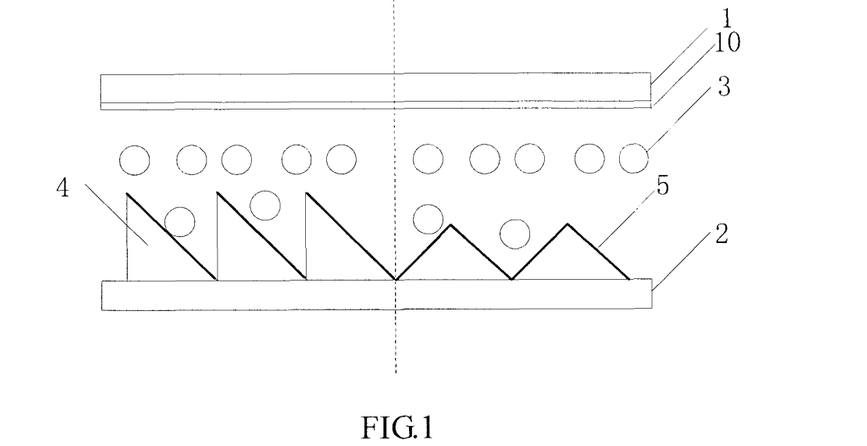
FIG. 1 is a schematic structural diagram of the transflective liquid crystal display panel provided by an embodiment of the present invention, with no voltage applied thereto.

Referring to FIG. 1, a transflective liquid crystal display panel provided by an embodiment of the present invention is illustrated, and comprises:

a color-filter substrate 1 and an array substrate 2 having a transmissive region and a reflective region;

blue-phase liquid crystal 3, filled between the color-filter substrate 1 and the array substrate 2;

a common electrode 10, formed on the color-filter substrate 1 on the side in contact with the blue-phase liquid crystal 3;

transparent protrusions 4, formed in the transmissive region and the reflective region of each pixel unit of the array substrate; and reflective portions 5, formed on each of the transparent protrusions 4 on the side in contact with the blue-phase liquid crystal 3.

It should be noted that, FIG. 1 shows a pixel unit between the color-filter substrate 1 and the array substrate 2; the right side of the dotted line is the reflective region, and the left side of the dotted line is the transmissive region.

The structure of the blue-phase liquid crystal in FIG. 1 is in a spherical structure when no voltage is applied thereto.

The reflective portions 5 and the transparent protrusions 4 also may be provided on the color-filter substrate 1, or may be provided on both the color-filter substrate 1 and the array substrate 2.

In the transmissive region, each of the reflective portions 5 comprises thereon a first reflective surface and a second reflective surface; in the reflective region, each of the reflective portions 5 comprises thereon a first reflective surface. The first reflective surface is a surface in contact with the blue-phase liquid crystal 3, and the second reflective surface is a surface in contact with the transparent protrusion.

For example, the cross-section of each transparent protrusion 4 has the shape of a right triangle; the right triangle of one corresponding transparent protrusion 4 in the transmissive region has one right-angle side thereof disposed on the array substrate 2, whereas the right triangle of one corresponding transparent protrusion 4 in the reflective region has its hypotenuse disposed on the array substrate 2.

The surface of the transparent protrusion 4 comprises two lateral sides: in the transmissive region, that is, one lateral side corresponding to the hypotenuse of the right triangle, and one lateral side corresponding to the right-angle side of the right triangle (this lateral side corresponding to the right-angle side is a lateral side not in contact with the array substrate); in the reflective region, that is, two lateral sides corresponding to the two right-angle sides of the right triangle. The reflective portion 5 is formed on the surface of the right-triangle shaped transparent protrusion 4, including: in the transmissive region, it is formed on the hypotenuse of the right triangle, and in the reflective region, it is formed on the two right-angle sides of the right triangle.

Each reflective portion is an electrically non-conductive film layer having light-reflecting function.

Below, the principle of implementing display of the transflective liquid crystal display panel provided by the embodiment of the present invention is explained.

Figure 2:
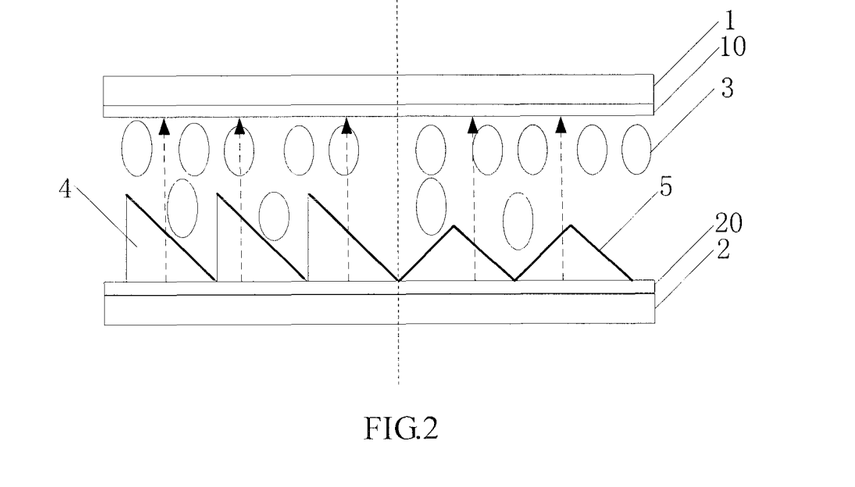
FIG. 2 is a schematic structural diagram of the transflective liquid crystal display panel provided by an embodiment of the present invention, with a voltage applied thereto.

Referring to FIG. 2, in the present invention, the common electrode 10 is provided on the color-filter substrate 1; the common electrode 10 and the pixel electrode 20 of the pixel unit on the array substrate 2 generate a vertical electric field between the color-filter substrate 1 and the array substrate 2.

When no voltage is applied between the color-filter substrate 1 and the array substrate 2, the blue-phase liquid crystal molecules are isotropic and substantially in a spherical structure; in this case, the long axes of the blue-phase liquid crystal molecules are relatively short, and when the light from a backlight or the light from external ambient passes through the blue-phase liquid crystal molecules, the phase of the light is not changed. FIG. 1 illustrates the structure and the shape of the blue-phase liquid crystal molecules in the case of no voltage applied thereto.

When a certain voltage is applied between the color-filter substrate 1 and the array substrate 2, a vertical electric field is generated between the color-filter substrate 1 and the array substrate 2; since the liquid crystal display panel provided by the embodiment of the present invention is not provided thereon with an alignment film, the blue-phase liquid crystal molecules under the effect of the vertical electric field are elongated in their long axes with their long axes being parallel to the direction of the electric field lines. FIG. 2 illustrates the structure and the shape of the blue-phase liquid crystal molecules in the case of a voltage applied thereto. In FIG. 2, the dashed lines with arrowheads are electric field lines of the vertical electric field. The electric field lines in FIG. 2 only represent the direction of the electric field, instead of the electric field intensity.

Figure 3:
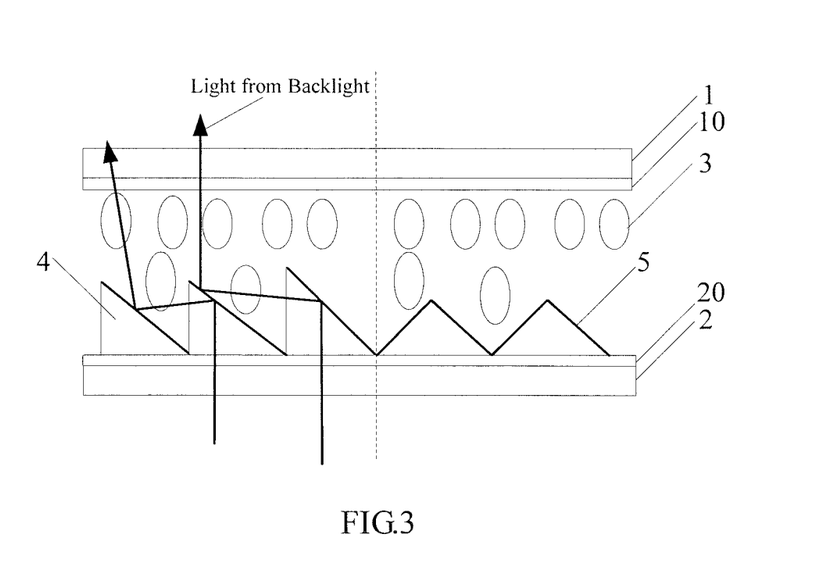
FIG. 3 is a schematic trajectory diagram of light when passing through a transmissive region of the transflective liquid crystal display panel provided by an embodiment of the present invention.

Referring to FIG. 3, when the light from a backlight passes through the liquid crystal display panel in the transmissive region, the light (illustrated as the broken lines with arrowheads) enters, perpendicularly to the panel, the liquid crystal layer, and arrives at the second reflective surfaces of the reflective portions 5 (the reflective portions which are provided on the hypotenuse of the triangles), and is changed by a certain angle in the light propagation direction by the reflective portions 5 on the hypotenuse of the transparent protrusions 4, and then the light is changed by a certain angle in the light propagation direction by the first reflective surfaces of the reflective portions 5 on the adjacent transparent protrusions 4, and thereafter the light is emitted out through the color-filter substrate 1.

When the light from a backlight is parallel to the long axes of the liquid crystal molecules, there is no phase retardation; when the light from a backlight is parallel to the long axes of the liquid crystal molecules, and then parallel to the short axes of the liquid crystal molecules after it reflected by the reflective portions 5 (i.e., the light is changed by 90°), there is phase retardation of the light.

When the light from a backlight has a certain angle with respect to the long axes of the blue-phase liquid crystal molecules, the horizontal component (the direction parallel to the color-filter substrate 1 or the array substrate 2 is defined as a horizontal direction) of the light is changed in phase, and by changing the phase of light, images with different gray scales are displayed. The vertical component (the direction perpendicular to the color-filter substrate 1 or the array substrate 2 is defined as a vertical direction) of the light is not changed in phase. By changing the voltages applied between the color-filter substrate 1 and the array substrate 2, the long axes of the blue-phase liquid crystal molecules change, causing change of the image gray scales, thereby displaying different images. Only if the triangle corresponding to the transparent protrusions 4 are not an isosceles right triangle, the light from a backlight has a certain angle with respect to the long axes of the blue-phase liquid crystal molecules.

Figure 4:
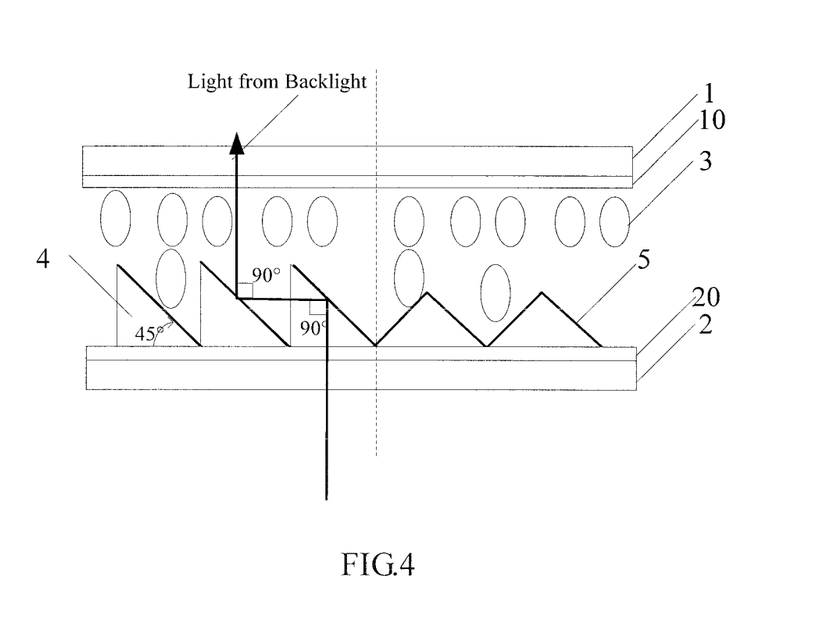
FIG. 4 is a schematic trajectory diagram of light when passing through a transmissive region of the transflective liquid crystal display panel provided by an embodiment of the present invention.

FIG. 4 shows a light propagation path in the transmissive region in the case where the triangle corresponding to the transparent protrusions 4 is an isosceles right triangle, and the light is changed by 90° in the light direction by the reflective portions 5.

Figure 5:
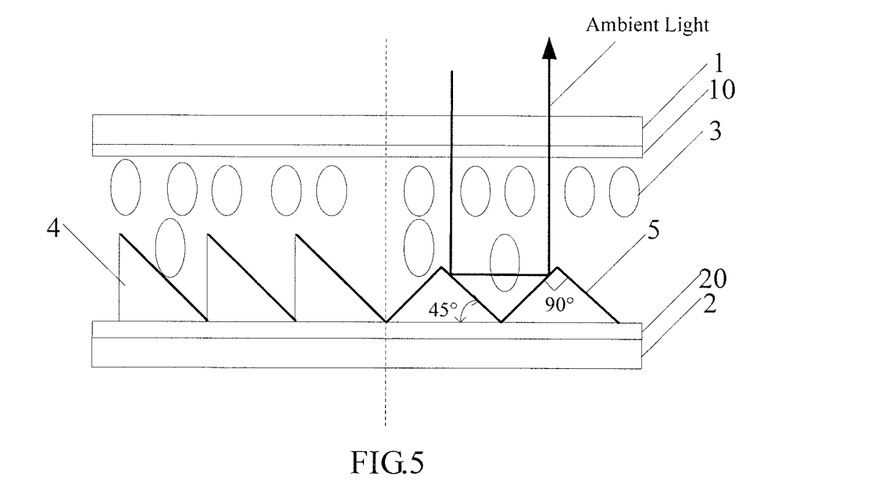
FIG. 5 is a schematic trajectory diagram of light when passing through a reflective region of the transflective liquid crystal display panel provided by an embodiment of the present invention.

FIG. 5 shows a light propagation path in the reflective region in the case where the triangle corresponding to the transparent protrusions 4 is an isosceles right triangle. When the light from external environment passes through the liquid crystal display panel in the reflective region, the light enters, perpendicularly to the panel, the liquid crystal layer, and firstly is reflected by the first reflective surface of a reflective portion 5 provided on a right-angle side of the right triangle corresponding to the reflective portion 5, to change the light propagation direction, and then the light is projected onto the first reflective surface of the reflective portion 5 of an adjacent transparent protrusion 4, to change the light propagation direction again, so that the light is emitted out through the color-filter substrate 1.

Likewise, when light passes through the blue-phase liquid crystal molecules, the horizontal component of the light is changed in phase, and by changing the phase of light, images with different gray scales are displayed. The vertical component of the light is not changed in phase. By changing the voltages applied between the color-filter substrate 1 and the array substrate 2, the long axes of the blue-phase liquid crystal molecules change, causing change of the image gray scales, thereby displaying different images.

The light illustrated in FIG. 5 is reflected by the reflective portions 5 of the transparent protrusions, to change the light propagation direction twice, with each time being changed by 90°.

Figure 6:
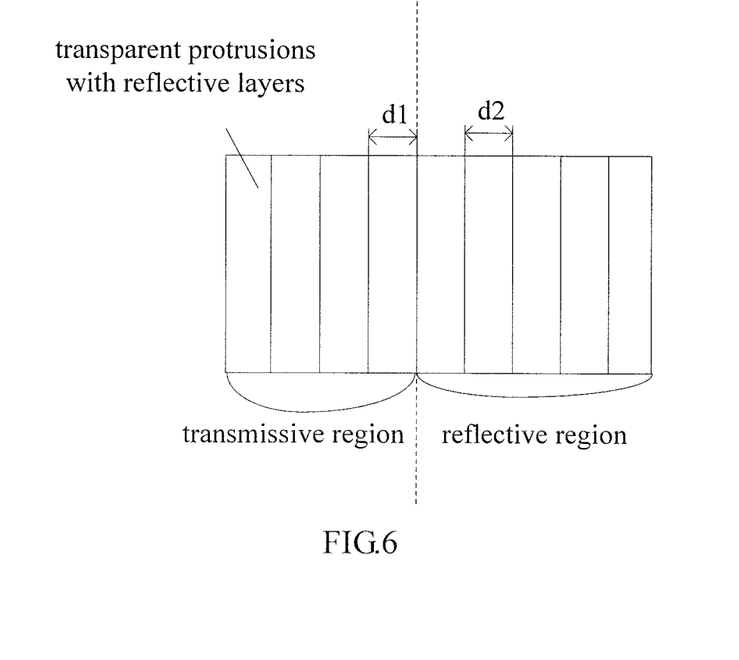
FIG. 6 is a schematic plan view, on an array substrate, of the transparent protrusions provided by an embodiment of the present invention.

For example, the transmissive region and the reflective region in each pixel unit of the array substrate 2 comprise a plurality of transparent protrusions 4, the projections of which on the array substrate 2 are in a strip-like arrangement, and the reflective portion 5 of each transparent protrusion 4 is provided with its projection on the array substrate in a strip-like arrangement as well. That is to say, the reflective portion 5 made of an electrically non-conductive film layer covers each transparent protrusion 4. FIG. 6 illustrates a schematic projection diagram, on the array substrate 2, of the transparent protrusions 4; the strip-like pattern in FIG. 6 indicates the region of the array substrate 2 covered by the transparent protrusions 4. In the transmissive region, the width of each strip-like figure corresponds to the length d1 of the right-angle side, which is in contact with the array substrate, of the triangle in the transmissive region; in the reflective region, the width of each strip-like figure corresponds to the length d2 of the hypotenuse of the triangle in the reflective region as illustrated in FIG. 5.

For example, in order to enable all the light passing through the reflective portion 5 of the transparent protrusion 4 to realize better displayed image, the bottom surfaces of the transparent protrusions 4 of each pixel unit are adjoin with each other.

For example, in order to make the quality of image display better, the shapes of the transparent protrusions 4 in the transmissive region and the reflective region in each pixel unit are the same. However, the transparent protrusion 4 in the transmissive region and the transparent protrusion 4 in the reflective region may have the same or different sizes.

The cross-sectional view of the transparent protrusion 4 may have the shape of a triangle. The light passing through the triangle-shaped reflective portion emits out through the color-filter substrate 1 at a non-90° angle, and therefore the viewing angle of the liquid crystal display panel is relatively large.

For example, the cross-section of the transparent protrusions 4 in the transmissive region and the reflective region have the shape of an isosceles right triangle; the isosceles right triangle corresponding to the transparent protrusions 4 in the transmissive region has one right-angle side thereof disposed on the array substrate, with a reflective portion 5 being formed on the hypotenuse of the isosceles right triangle; the isosceles right triangle corresponding to the transparent protrusions 4 in the reflective region has its hypotenuse disposed on the array substrate, with reflective portions 5 being formed on the two right-angle sides of the isosceles right triangle. Thus, the light passing through the reflective portions 5 of the isosceles right triangles is not changed in the direction after twice reflection in the transmissive region, and is changed by 180° in the direction after twice reflection in the reflective region, and then the light emits perpendicularly out through the color-filter substrate 1.

For example, the length d1 of the right-angle side of the isosceles right triangle corresponding to the transparent protrusion 4 in the transmissive region is equal to the length d2 of the hypotenuse of the isosceles right triangle corresponding to the transparent protrusion 4 in the reflective region. This ensures that: the phase retardation of the light passing through the panel corresponding to the transmissive region is identical to the phase retardation of the light passing through the panel corresponding to the reflective region, thereby achieving better display quality.

For example, all the transparent protrusions 4 in the transmissive region have the same size, and the hypotenuses of the corresponding isosceles right triangles are oriented in the same direction.

Figure 7:
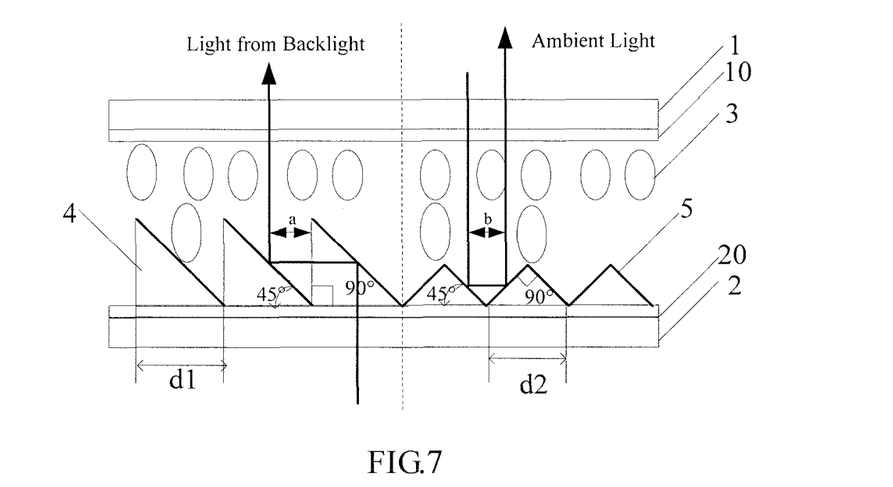
FIG. 7 is a schematic trajectory diagram of light when passing through a transmissive region and a reflective region of the transflective liquid crystal display panel.

As illustrated in FIG. 7, in the case where the length d1 of the right-angle side of the isosceles right triangle corresponding to the transparent protrusion 4 in the transmissive region is equal to the length d2 of the hypotenuse of the isosceles right triangle corresponding to the transparent protrusion 4 in the reflective region, i.e., d2=d1, the light passing through the midpoint of the hypotenuse of the triangle corresponding to the transparent protrusion in the transmissive region has an identical horizontal traveling distance through the liquid crystal to that of the light passing through the midpoint of the right-angle side of the triangle corresponding to the transparent protrusion in the reflective region, i.e., a=b=D.

Further, because liquid crystal under a same voltage has a same refractive index $\Delta n$, the phase retardation of the light, respectively passing through the horizontal directional liquid crystal layer in both the transmissive region and the reflective region, is equal, that is, $\Delta n*D$.

Further, because each light ray passing through the transmissive region corresponds to certain light ray passing through the reflective region, so the traveling distance of the light passing through the transmissive region in a horizontal direction is equal to the traveling distance of the light passing through the reflective region in the horizontal direction, and thus the light passing through the entire panel has equal phase retardation. This makes the image, corresponding to the transmissive region and the reflective region under a certain voltage respectively, consistent, thereby improving the image quality.

For example, the maximum height of the transparent protrusion 4 located in the transmissive region (i.e., the side length of right-angle side) is approximately 1 μm~3 μm, and the maximum height of the transparent protrusion located in the reflective region is approximately 0.5~2 μm. Accordingly, the cell thickness of the liquid crystal cell may be set, but not limited, to 4 μm~6 μm.

It should be noted that, if the maximum height of the transparent protrusion 4 is set too high and exceeding 3 μm, then it will affect the mobility of the blue-phase liquid crystal molecules, and subsequently affect the final displayed image. If the maximum height of the transparent protrusion 4 is set too low and less than 1 μm, then the manufacturing process is relatively difficult, and the manufactured transparent protrusions 4 are insufficiently regular; moreover, light diffusion is likely to occur, which causes the light not able to propagate along the propagation direction as illustrated in FIG. 4 or FIG. 5, thus it can not achieve the aim of the present invention for reducing the driving voltage of the transflective liquid crystal display, and can not balance the phase retardation respectively produced when light passes through the transmissive region and the reflective region, and it is difficult to achieve higher quality of displayed images. Thus, through experimental verification, the maximum height of the transparent protrusion 4 provided by the embodiment of the present invention may be any value in the range of 1 μm~3 μm.

When d2=d1, and the cross-sections of the transparent protrusions 4 all have the shape of an isosceles right triangle, if the right-angle side length of the transparent protrusion 4 located in the transmissive region is determined, then the side length of the transparent protrusion located in the reflective region is also determined.

The reflective surfaces of the reflective portions 5 are made of a reflective and electrically non-conductive material.

An embodiment of the present invention also provides a transflective liquid crystal display, which comprises a transflective liquid crystal display panel as described above, for implementing image display with transflective liquid crystal.

Figure 8:
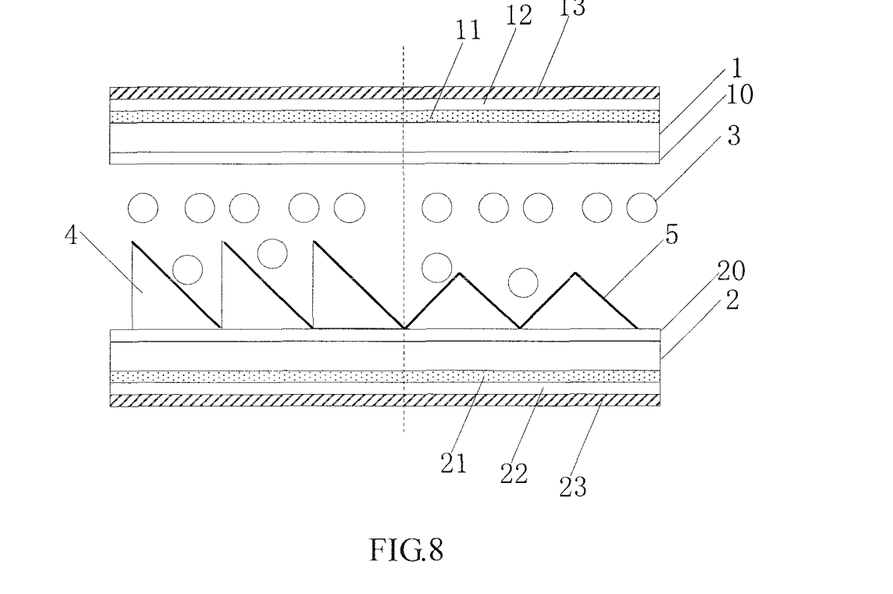
FIG. 8 is a schematic structural diagram of the transflective liquid crystal display provided by an embodiment of the present invention.

For example, referring to FIG. 8, the liquid crystal display provided by the embodiment of the present invention further comprises:

a first quarter-waveplate 11, provided on the color-filter substrate 1 on the side not in contact with the blue-phase liquid crystal 3; a first half-waveplate 12, provided on the first quarter-waveplate 11; a first polarizer 13, provided on the first half-waveplate 12; and a second quarter-waveplate 21, provided on the array substrate 2 on a side not in contact with the blue-phase liquid crystal; a second half-waveplate 22, provided on the second quarter-waveplate 21; a second polarizer 23, provided on the second half-waveplate 22.

In the transflective liquid crystal display panel of the present invention, the electrodes are disposed in a vertical setting mode, and the transparent protrusions and the reflective portions are directly disposed on an existing array substrate.

The manufacturing process of the transflective liquid crystal display panel provided by the embodiment of the present invention may be the same as the prior art, with the difference lying in the manufacturing process of the reflective portions and the transparent protrusions.

Moreover, the present invention uses a single cell-gap structure, that is, the liquid crystal layer in the transmissive region and the reflective region has the same thickness, so that the manufacturing process is simple.

Below, the manufacturing process of the transparent protrusions and the reflective portions provided by the embodiment of the present invention, will be explained through a specific manufacturing procedure, which comprises the steps as follows:

First, on an array substrate provided with pixel electrodes, by using a spin-coating method, a layer of a transparent polymer material or a transparent resin material with a certain thickness is coated.

Second, with a pre-designed mask plate (Mask), an exposing process is performed, and then the exposed portion is developed.

Third, with an etching solution, the unnecessary portion after a developing process is removed with the transparent protrusions left.

Fourth, the manufactured transparent protrusions are subjected to a curing and aging process.

Fifth, with a sputtering or chemical deposition method, a layer of reflective and electrically non-conductive film is formed on the array substrate having the transparent protrusions, and thus the reflective portions are formed.

The above-described manufacturing process of the reflective portions is simple and easy to implement.

The embodiments of the present invention provide a transflective liquid crystal display panel and a transflective liquid crystal display; a vertical electric field is applied within the liquid crystal display panel, the driving voltage of the device is reduced, and the power consumption is reduced as well; transparent protrusions are provided on a substrate on the side in contact with the liquid crystal molecules, as well as the reflective portions provided on the transparent protrusions, image display can be realized, and phase retardation respectively produced when light passes through a transmissive region and a reflective region is balanced, and therefore higher quality of displayed images can be achieved.

The embodiments of the present invention provide a transflective liquid crystal display panel and a transflective liquid crystal display; blue-phase liquid crystal is filled between the color-filter substrate and the array substrate, the device has a faster response speed; and a common electrode is formed on the color-filter substrate on the side in contact with the blue-phase liquid crystal, so that a liquid crystal display panel having a vertical electric field is formed, which reduces the driving voltage of the device and reduces the power consumption.

The above are merely exemplary implementations of the present invention, but not for limiting the scope of the invention; instead, the scope of the invention should be defined by the appended claims.

The invention claimed is:

1. A transflective liquid crystal display panel, comprising a color-filter substrate, an array substrate, and blue-phase liquid crystal filled between the color-filter substrate and the array substrate, wherein the transflective liquid crystal display panel further comprises:

a common electrode, formed on the color-filter substrate;

transparent protrusions, formed in a transmissive region and a reflective region of each pixel unit of the array substrate;

reflective portions, formed on the transparent protrusions of the transmissive region and the reflective region respectively.

2. The transflective liquid crystal display panel according to claim 1, wherein the reflective portions are electrically non-conductive light-reflecting film layers.

3. The transflective liquid crystal display panel according to claim 1, wherein each of the reflective portions in the transmissive region comprises thereon a first reflective surface and a second reflective surface, and each of the reflective portions in the reflective region comprises thereon a first reflective surface, wherein the first reflective surface is in contact with the blue-phase liquid crystal, and the second reflective surface is in contact with the transparent protrusion.

4. The transflective liquid crystal display panel according to claim 1, further comprising a pixel electrode formed on the array substrate, wherein the transparent protrusions are provided on the pixel electrode.

5. The transflective liquid crystal display panel according to claim 3, wherein in the transmissive region, light from a backlight is reflected by the second reflective surface of the reflective portion of one transparent protrusion to change a direction of the light, so that the light travels towards the first reflective surface of the reflective portion of one adjacent transparent protrusion to change the direction of the light again, and then the light emits out through the color-filter substrate.

6. The transflective liquid crystal display panel according to claim 3, wherein in the reflective region, light from outside is changed in a direction of the light twice by the first reflective surfaces of the reflective portions of adjacent transparent protrusions, and then emits out through the color-filter substrate.

7. The transflective liquid crystal display panel according to claim 1, when no voltage is applied between the color-filter substrate and the array substrate, the blue-phase liquid crystal molecules are isotropic.

8. The transflective liquid crystal display panel according to claim 1, wherein when a voltage is applied between the color-filter substrate and the array substrate, a vertical electric field is generated between the color-filter substrate and the array substrate, and
wherein the blue-phase liquid crystal molecules under the effect of the vertical electric field are elongated in their long axes with their long axes being parallel to the electric field direction.

9. The transflective liquid crystal display panel according to claim 1, wherein the transmissive region and the reflective region in each pixel unit comprise a plurality of transparent protrusions, projections of which on the array substrate are in a strip-like arrangement, and the reflective portion on each transparent protrusion has its projection on the array substrate also in a strip-like arrangement.

10. The transflective liquid crystal display panel according to claim 1, wherein bottom surfaces of the transparent protrusions in each pixel unit adjoin each other.

11. The transflective liquid crystal display panel according to claim 1, wherein shapes of the transparent protrusions in the transmissive region and the reflective region in each pixel unit are the same or different.

12. The transflective liquid crystal display panel according to claim 1, wherein sizes of the transparent protrusions in the transmissive region and the reflective region in each pixel unit are the same or different.

13. The transflective liquid crystal display panel according to claim 1, wherein a cross-section of each transparent protrusion is in a shape of a triangle.

14. The transflective liquid crystal display panel according to claim 13, wherein the cross-section of the transparent protrusion is in a shape of a right triangle.

15. The transflective liquid crystal display panel according to claim 14, wherein the cross-section of the transparent protrusion is in a shape of an isosceles right triangle.

16. The transflective liquid crystal display panel according to claim 14, wherein the right triangle corresponding to each transparent protrusion in the transmissive region has one right-angle side thereof disposed on the array substrate, with the reflective portion being formed on the hypotenuse of the right triangle; and
the right triangle corresponding to each transparent protrusion in the reflective region has its hypotenuse disposed on the array substrate, with the reflective portion being formed on the two right-angle sides of the right triangle.

17. The transflective liquid crystal display panel according to claim 14, wherein a length of the right-angle side of the right triangle corresponding to each transparent protrusion in the transmissive region is equal to a length of the hypotenuse of the right triangle corresponding to each transparent protrusion in the reflective region.

18. The transflective liquid crystal display panel according to claim 14, wherein a length of the right-angle side of each transparent protrusion in the transmissive region is 1~3 μm.

19. A transflective liquid crystal display, comprising a transflective liquid crystal display panel in accordance with claim 1.

20. The transflective liquid crystal display according to claim 19, further comprising:
a first quarter-waveplate, provided on the color-filter substrate on a side not in contact with the blue-phase liquid crystal;
a first half-waveplate, provided on the first quarter-waveplate;
a first polarizer, provided on the first half-waveplate; and
a second quarter-waveplate, provided on the array substrate on a side not in contact with the blue-phase liquid crystal;
a second half-waveplate, provided on the second quarter-waveplate; and
a second polarizer, provided on the second half-waveplate.

* * * * *